(12) United States Patent
Chu et al.

(10) Patent No.: US 8,619,808 B2
(45) Date of Patent: Dec. 31, 2013

(54) MECHANISM TO UPDATE A NAV TIMER

(75) Inventors: Liwen Chu, San Ramon, CA (US);
George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 120 days.

(21) Appl. No.: 13/231,668

(22) Filed: Sep. 13, 2011

(65) Prior Publication Data

US 2012/0063446 A1 Mar. 15, 2012

Related U.S. Application Data

(60) Provisional application No. 61/382,731, filed on Sep. 14, 2010.

(51) Int. Cl.
*H04L 12/43* (2006.01)
*H04J 3/02* (2006.01)

(52) U.S. Cl.
USPC ........... 370/461; 370/328; 370/329; 370/338; 370/462

(58) Field of Classification Search
USPC ............................ 370/328, 329, 338, 461, 462
See application file for complete search history.

(56) References Cited

U.S. PATENT DOCUMENTS

| | | | |
|---|---|---|---|
| 2007/0127428 A1* | 6/2007 | Lee et al. ................ | 370/338 |
| 2008/0112351 A1* | 5/2008 | Surineni et al. ......... | 370/312 |
| 2008/0205317 A1* | 8/2008 | Piipponen et al. ...... | 370/311 |
| 2009/0187661 A1* | 7/2009 | Sherman ................. | 709/226 |
| 2010/0039969 A1* | 2/2010 | Sukenari et al. ........ | 370/310 |
| 2010/0054213 A1* | 3/2010 | Trainin .................... | 370/336 |
| 2011/0310860 A1* | 12/2011 | Denteneer .............. | 370/336 |
| 2012/0063446 A1* | 3/2012 | Chu et al. ................ | 370/349 |

* cited by examiner

*Primary Examiner* — Benjamin H Elliott, IV
(74) *Attorney, Agent, or Firm* — Hogan Lovells US LLP

(57) ABSTRACT

In a 60 Hz WGA wireless network, not all frames with the duration field are received by a STA in a WGA network because of directional antennas. Therefore, a NAV Timer cannot account for the reserved duration of the channel by only updating with the longest duration field received. A STA can receive two frames each with a source and destination addresses and update the NAV Timer by comparing the received addresses to overcome such problem. Further, a STA can receive one frame with a source and destination addresses and update the NAV Timer by comparing the received addresses with the NAVSRC and NAVDST values.

22 Claims, 1 Drawing Sheet

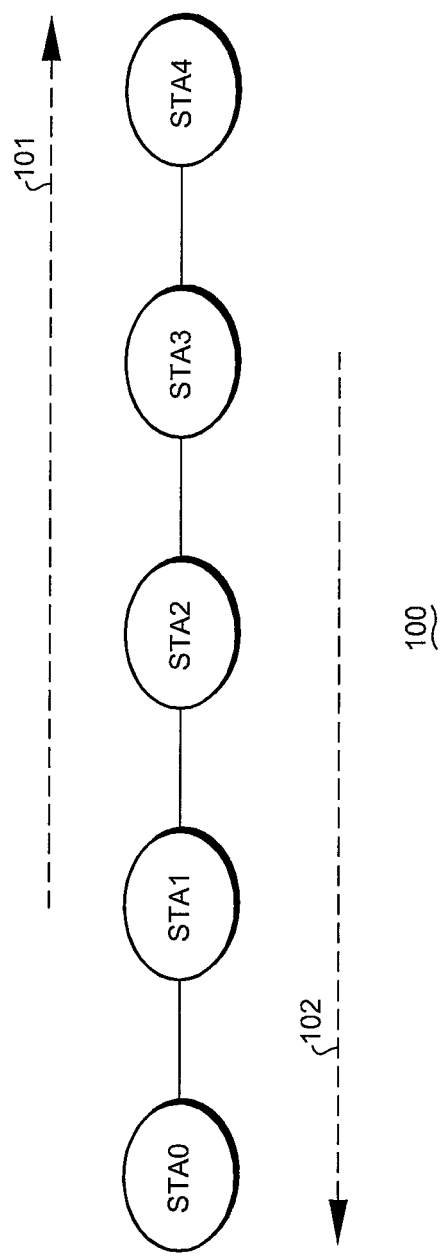

MECHANISM TO UPDATE A NAV TIMER

RELATED APPLICATION

The present application relates to and claims the benefit of priority to U.S. Provisional Patent Application No. 61/382,731 filed Sep. 14, 2010 which is hereby incorporated by reference in its entirety for all purposes as if fully set forth herein.

BACKGROUND OF THE INVENTION

1. Field of the Invention

The present invention generally relates to an apparatus and method for wireless communication with multiple stations (STAs), and, more particularly, to a mmWave (millimeter wave) communication system and method for updating NAV timers in directional communication with multiple STAs.

2. Relevant Background

In wireless communication under 802.11 standard, most frames transmitted carry a duration field, which is for reserving the use of a channel to a transmitting/receiving STAs for a specific time. Because each channel has other STAs not active for a frame, the duration field signals to other STAs the reserved status of a channel within a duration for with the transmitting and receiving STAs.

A Network Allocation Vector (NAV) Timer in a STA accounts and counts down the time of which the channel will be reserved from the duration field. STAs will normally have a buffer to store the NAV timer and to count down time from the reserved duration.

As such, a STA in 802.11 mode requires only one buffer for the NAV Timer as a STA in a 802.11 mode normally transmits and receives with an omnidirectional antenna reserved channel can be accessed by all STAs within range of the omnidirectional antenna. Therefore, the NAV Timer needs only to update with the longest duration field received in the channel. However, this NAV Timer configuration is not optimal for directional antenna operation as not all STAs in the channel is within range of the directional antenna and a STA can detect multiple simultaneous transmission.

Accordingly, there is a need in the art for a mechanism to update the NAV timer in directional communication with multiple STAs, such as in mmWave communication.

SUMMARY OF THE INVENTION

Accordingly, the present invention is directed to an apparatus and method for updating a NAV Timer when a STA can detect multiple simultaneous transmission in a basic service set (BSS) or neighboring BSS. Accordingly, a STA needs to save multiple NAV values by multiple NAV Timers. The NAV Timers are identified by the source address (called NAVSRC) and the destination address (called NAVDST).

Briefly stated, one aspect of the present invention involves a method of receiving two frames each with a source and destination addresses and updating the NAV Timer based on comparing the received source and destination addresses. In another aspect of the invention, the source address of the first frame is '0' in an ACK frame, and the destination address of the first frame is '0' in a mmWaveCTS-to-Self frame.

Another aspect of the present invention involves a method of receiving a frame with a source and destination addresses and updating the NAV Timer based on comparing the received address with a Network Allocation Vector Source (NAVSRC) and Network Allocation Vector Destination (NAVDST) values.

Yet another aspect of the present invention involves an apparatus for wireless communication comprising an antenna for receiving at least two frame, wherein each frame comprises a transmitter address (TA) and a receiver address (RA), and a NAV Timer configured to be updated based on comparing the TAs and RAs. In another aspect of the invention, the antenna is a direction antenna, the apparatus is a STA in a BSS, and the antenna does not receive all frames in the BSS.

BRIEF DESCRIPTION OF THE DRAWING

FIG. 1 is the sole exemplary diagram of a directional wireless network topology according to an embodiment of the invention.

DETAILED DESCRIPTION OF THE PREFERRED EMBODIMENTS

Embodiments of the present invention are hereafter described in detail with reference to the accompanying figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying figures is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

Reference will now be made in detail to an embodiment of the present invention, an example of which is illustrated in the accompanying drawings.

FIG. 1 illustrates a directional wireless network topology according to an embodiment of the invention.

In a directional wireless network 100, a 60 Hz WGA network according to an exemplary embodiment, directional antenna is used in at least the contention-based period (CBP) and the service period (SP) of the communication. There are multiple simultaneous transmissions in a basic service set (BSS) 100 or with groups of overlapping BSSs because of the directional transmission and reception, and a STA has higher chance to detect such simultaneous transmission. These multiple transmissions will result in multiple duration time being reserved in a channel with different NAV time being the record duration to avoid interference. The NAV Time is identified by the source address (called NAVSRC) and the destination address (called NAVDST).

On the other hand, a STA in 802.11 mode using omnidirectional antenna has a substantially lower chance of detecting simultaneous transmission; therefore, only one duration will need to be accounted for as a STA cannot transmit in a duration not reserved for itself However, in mmWave communication using directional antenna, one problem with multiple duration times is that a STA should update the same duration time when it receives multiple frames of a transmission opportunity (TXOP). The RA and TA of these frames belonging to the same TXOP may have different values, i.e. TA has a '0' value, the RA and TA are interchanged, etc.

In an exemplary embodiment of the invention, referring to FIG. 1, STA0-STA4 are STAs in a BSS or a 60 Hz WGA network 100. STA1 is a TXOP/SP source, and STA3 is a TXOP Responder/SP destination. STA1's beamformed transmission 101 can be correctly decoded by STA2, STA3, and STA4, but not STA0. STA3's beamformed transmission 102 can be correctly decoded by STA0, STA1, STA2, but not STA4.

A NAV update algorithm needs to guarantee that all frames of the TXOP/SP from the pair STAs (STA1 and STA3) locate and use one and only one NAV timer, taking into account that STA0 and STA4 cannot receive or correctly decode directional transmission from STA1 and STA3, respectively.

The NAV update algorithm needs to take into account a variety of frames dealing with different transmit and/or receive media access control (MAC) addresses. The NAV update algorithm needs to content with transmit frames (i.e. data frames), reverse direction (RD) operation frames, single-address frames (i.e. mmWaveCTS-to-Self and ACK frames), and multiple-address frames (i.e. data, management, RTS, and mmWaveCTS frames). These variety of frames contain different destination (DST) and source (SRC) MAC addresses. The NAV update algorithm needs to find and update the same NAV Timer in a STA for these frames.

In the exemplary embodiment of the invention referred to in FIG. 1, SRC is assumed to be the transmitter address (TA), STA1, and DST is assumed to be the receiver address (RA), STA3; the reverse (DST=STA1, SRC=STA3) is assumed in RD. From the beamforming transmission characteristics 101 and 102 of STA1 and STA3 as noted above, STA0, STA2, and STA4 receives frames from STA1 and STA3 to update their NAV timers. From the STAs point view, STA0 receives from STA3 only, STA4 receives from STA1 only, and STA2 receives from both STA0 and STA3.

Thus, according to an embodiment of the invention, STA2 may receive frames from both STA1 and STA3 and may process frames with two MAC addresses as the SRC and DST addresses in these frames. During a TXOP/SP with RD, STA2 may first correctly decode data frame (DST=STA3, SRC=STA1) transmitted by STA1; during the subsequent RD period, STA2 may correctly decode data frame (DST=STA1, SRC=STA3) transmitted by STA3. As these frames affect the same duration for the same STAs pair (STA1 and STA3), the NAV update algorithm should find and update the same NAV Timer in STA2 for these frames for the same TXOP/SP.

Further, during TXOP/SP with RD and mmWaveCF-End, STA2 may first correctly decode data frame (DST=STA3, SRC=STA1) transmitted by STA1; then STA2 may correctly decode mmWaveCF-End (DST=STA1, SRC=STA3) transmitted by STA3. As these frames affect the same duration for also the same STAs pair (STA1 and STA3), the NAV update algorithm should find and update the same NAV Timer in STA2 for these frames for the same TXOP/SP.

Further, during TXOP/SP with RD and mmWaveCF-End, STA2 may first correctly decode ACK frame (DST=STA3, SRC=0) transmitted by STA1; then STA2 may correctly decode mmWaveCF-End (DST=STA1, SRC=STA3) transmitted by STA3. As these frames affect the same duration for also the same STAs pair (STA1 and STA3), the NAV update algorithm should find and update the same NAV Timer in STA2 for these frames for the same TXOP/SP.

Further, during TXOP/SP, STA may first correctly decode data frame (DST=STA3, SRC=STA1) transmitted by STA1; then STA2 may correctly decode ACK (DST=STA1, SRC=0) transmitted by STA3. As these frames affect the same duration for also the same STAs pair (STA1 and STA3), the NAV update algorithm should find and update the same NAV Timer in STA2 for these frames for the same TXOP/SP.

Thus, for these scenarios where a STA such as STA2 may receive frames from both transmitting/receiving STAs (STA1 and STA3), the NAV update algorithm can realize that they are from the same TXOP/SP and can update the same NAV Timer for these frames.

According to an embodiment of the invention, the NAV Timer for STA0 receiving frames from only STA3 may process frames with one or two MAC addresses. As STA0 cannot receive from STA1, single address frames sent from STA3 to STA1, such as the ACK frame, must be correctly attributed to the STA1/STA3 pair when received by STA0 when considering to update the NAV Timer. During TXOP/SP with RD, first, STA0 may correctly decode an ACK frame (DST=STA1, SRC=0); then STA0 may correctly decode a data frame (DST=STA1, SRC=STA3). As these frames affect the same duration of the same STA pair (STA1 and STA3), the NAV update algorithm should find and update the same NAV Timer in STA0 for these frames for the same TXOP/SP.

Further, during a TXOP/SP with RD and mmWaveCF-End, first, STA0 may correctly decode an ACK frame (DST=STA1, SRC=0); then STA0 may correctly decode a mmWaveCF-end frame (DST=STA1, SRC=STA3). As these frames affect the same duration for also the same STAs pair (STA1 and STA3), the NAV update algorithm should find and update the same NAV Timer in STA0 for these frames for the same TXOP/SP.

Similarly for STA4, according to an embodiment of the invention, the NAV Timer for STA4 receiving frames from only STA1 may process frames with one or two MAC addresses. As STA4 cannot receive from STA3, single address frames sent from STA1 to STA3, such as the ACK frame, must be correctly attributed to the STA1/STA3 pair when received by STA4 when considering to update the NAV Timer. During TXOP/SP with RD, first, STA4 may correctly decode an ACK frame (DST=STA3, SRC=0); then STA4 may correctly decode a data frame (DST=STA3, SRC=STA1). As these frames affect the same duration of the same STA pair (STA1 and STA3), the NAV update algorithm should find and update the same NAV Timer in STA4 for these frames for the same TXOP/SP.

Further, during a TXOP/SP with RD and mmWaveCF-End, first, STA4 may correctly decode an ACK frame (DST=STA3, SRC=0); then STA0 may correctly decode a mmWaveCF-end frame (DST=STA3, SRC=STA1). As these frames affect the same duration for also the same STAs pair (STA1 and STA3), the NAV update algorithm should find and update the same NAV Timer in STA4 for these frames for the same TXOP/SP.

Thus, for these scenarios where a STA such as STA0 or STA4 may receive frames only from one of the transmitting/receiving pair STAs (STA1 or STA3) and where a STA such as STA2 may receive frames from both of the transmitting and receiving STA (STA1 and STA3), the NAV update algorithm may first create a NAV Timer upon receiving an ACK frame noting the DST; then, by locating the subsequent data frame, the NAVSRC should be updated to the correct SRC (from 0 of the ACK frame to SRC of the data frame), thereby the same NAV Timer can also be correctly updated.

In another aspect of the invention, when a NAV Timer is first created by mmWaveCTS-to-Self and then located by a data frame, the NAVSRC and the same NAV Timer should be updated similarly to correct the DST (from 0 to DST of the data frame).

It is noted that the frames discussed herein are exemplary of the transmission frames that can be used by an algorithm to ascertain the transmitting/receiving STAs pair. The use of other transmission frames to update the NAV Timer for other directional communication configurations is apparent to those of ordinary skilled in the art.

From the scenarios discussed, a method of updating the NAV Timer can be implemented to address the single address frame according to another embodiment of the invention.

If a STA receives a mmWaveCTS-to-Self frame and the following data frames also have the same source address, the same NAV Timer will be updated.

If a STA receives a valid data frame with RA and TA values that match the NAVSRC and NAVDST values, in any order, and for any NAV Timer, then the STA should set the associated NAV Timer to the value of the duration field in the received frame.

If a STA receives a valid mmWaveCF-End response with RA and TA values that match the NAVSRC and NAVDST values, in any order, and for any NAV Timer, then the STA should set the associated NAV Timer to the value of the duration field in the received mmWaveCF-End frame. If one of the NAVSRC or NAVDST of a NAV Timer is 0 and the corresponding NAVDST or NAVSRC, respectively, of the NAV Timer match the RA or the TA value of the received valid mmWaveCF-End frame, then the STA should set the associated NAV Timer to the value of the duration field in the received mmWaveCF-End frame.

If a STA receives an ACK frame followed by a data frame where the RA in an ACK frame and the TA in a data frame are the same, the same NAV Timer will be updated.

If a STA receives an ACK frame followed by a data frame where the RA in an ACK frame and the RA in a data frame are the same, the same NAV Timer will be updated.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of updating a Network Allocation Vector (NAV) Timer, comprising:
    receiving a first frame with a first source address and a first destination address;
    receiving a second frame with a second source address and a second destination address; and
    updating the NAV Timer by comparing the first and second source addresses and the first and second destination addresses wherein:
    when a STA receives a mmWaveCTS-to-Self frame and the following data frames also have the same source address, the same NAV Timer will be updated;
    when a STA receives a valid data frame with RA and TA values that match the NAVSRC and NAVDST values, in any order, and for any NAV Timer, then the STA should set the associated NAV Timer to the value of the duration field in the received frame;
    when a STA receives a valid mmWaveCF-End response with RA and TA values that match the NAVSRC and NAVDST values, in any order, and for any NAV Timer, then the STA should set the associated NAV Timer to the value of the duration field in the received mmWaveCF-End frame;
    when one of the NAVSRC or NAVDST of a NAV Timer is 0 and the corresponding NAVDST or NAVSRC, respectively, of the NAV Timer match the RA or the TA value of the received valid mmWaveCF-End frame, then the STA should set the associated NAV Timer to the value of the duration field in the received mmWaveCF-End frame;
    when a STA receives an ACK frame followed by a data frame where the RA in an ACK frame and the TA in a data frame are the same, the same NAV Timer will be updated; and
    when a STA receives an ACK frame followed by a data frame where the RA in an ACK frame and the RA in a data frame are the same, the same NAV Timer will be updated.

2. The method of claim 1, further comprising setting the NAV Timer to a value of a duration field in the second frame.

3. The method of claim 1, wherein the first and second frames are either data, management, or control frames and wherein the first source address is the same as the first source address and the first destination address and the second destination address is the same.

4. The method of claim 1, wherein the first and second frames are either data, management, or control frames and wherein the first source address is the same as the second destination address and the first destination address and the second source address is the same.

5. The method of claim 1, wherein
    the first frame is a mmWaveCTS-to-Self frame, wherein the first destination address is '0', wherein
    the second frame is either a data, management, or control frame, and wherein
    the second source address is the same as the first source address.

6. The method of claim 1, wherein
    the first frame is an ACK frame, wherein the first source address is '0', wherein
    the second frame is either a data, management, or control frame, and wherein
    the second source address is the same as the first destination address.

7. The method of claim 1, wherein
    the first frame is an ACK frame, wherein the first source address is '0', wherein
    the second frame is either a data or management frame, and wherein
    the second destination address is the same as the first destination address.

8. A method of updating a Network Allocation Vector (NAV) Timer, comprising:
    receiving a frame with a source address and a destination address; and
    updating the NAV Timer based on comparing the source and destination addresses with a Network Allocation Vector Source (NAVSRC) value and a Network Allocation Vector Destination (NAVDST) value wherein:
    when a STA receives a mmWaveCTS-to-Self frame and the following data frames also have the same source address, the same NAV Timer will be updated;
    when a STA receives a valid data frame with RA and TA values that match the NAVSRC and NAVDST values, in any order, and for any NAV Timer, then the STA should set the associated NAV Timer to the value of the duration field in the received frame;

when a STA receives a valid mmWaveCF-End response with RA and TA values that match the NAVSRC and NAVDST values, in any order, and for any NAV Timer, then the STA should set the associated NAV Timer to the value of the duration field in the received mmWaveCF-End frame;

when one of the NAVSRC or NAVDST of a NAV Timer is 0 and the corresponding NAVDST or NAVSRC, respectively, of the NAV Timer match the RA or the TA value of the received valid mmWaveCF-End frame, then the STA should set the associated NAV Timer to the value of the duration field in the received mmWaveCF-End frame;

when a STA receives an ACK frame followed by a data frame where the RA in an ACK frame and the TA in a data frame are the same, the same NAV Timer will be updated; and when a STA receives an ACK frame followed by a data frame where the RA in an ACK frame and the RA in a data frame are the same, the same NAV Timer will be updated.

9. The method of claim 8, wherein the NAVSRC value and NAVDST value are not '0', the source and destination address are not '0', and source and destination addresses match the NAVSRC and NAVDST values in any order.

10. The method of claim 8, wherein one of the NAVSRC and NAVDST values is '0', the source and destination addresses are not '0', and one of the source and destination addresses match the non-'0' NAVSRC and NAVDST values in any order.

11. The method of claim 8, wherein the NAVSRC value and NAVDST value are not '0', and the source address is '0 and the destination address matches the NAVDST value or the NAVDST value in any order.

12. The method of claim 8, further comprising setting the NAV Timer to a value of a duration field in the frame.

13. An apparatus for wireless communication, comprising:
an antenna for receiving a plurality of frames comprising a first and second frames, wherein each frame comprises a transmitter address (TA) and a receiver address (RA), a Network Allocation Vector (NAV) Timer configured to be updated based on comparing the TAs and RAs of the first and second frame wherein:

when a STA receives a mmWaveCTS-to-Self frame and the following data frames also have the same source address, the same NAV Timer will be updated;

when a STA receives a valid data frame with RA and TA values that match the NAVSRC and NAVDST values, in any order, and for any NAV Timer, then the STA should set the associated NAV Timer to the value of the duration field in the received frame;

when a STA receives a valid mmWaveCF-End response with RA and TA values that match the NAVSRC and NAVDST values, in any order, and for any NAV Timer, then the STA should set the associated NAV Timer to the value of the duration field in the received mmWaveCF-End frame;

when one of the NAVSRC or NAVDST of a NAV Timer is 0 and the corresponding NAVDST or NAVSRC, respectively, of the NAV Timer match the RA or the TA value of the received valid mmWaveCF-End frame, then the STA should set the associated NAV Timer to the value of the duration field in the received mmWaveCF-End frame;

when a STA receives an ACK frame followed by a data frame where the RA in an ACK frame and the TA in a data frame are the same, the same NAV Timer will be updated; and when a STA receives an ACK frame followed by a data frame where the RA in an ACK frame and the RA in a data frame are the same, the same NAV Timer will be updated.

14. The apparatus of claim 13, wherein the antenna is a directional antenna.

15. The apparatus of claim 13, wherein the apparatus is a station (STA) in a basic service set (BSS).

16. The apparatus of claim 13, wherein the apparatus is a station (STA) in a basic service set (BSS) and the antenna is a directional antenna and wherein the antenna does not receive all frames in the BSS.

17. The apparatus of claim 13, wherein the TA of the first frame equals the RA of the second frame and the TA of the second frame equals the RA of the first frame.

18. The apparatus of claim 13, wherein the TA of the first frame is '0' and one of the TA and the RA of the second frame equals the RA of the first frame.

19. The apparatus of claim 18, wherein the first frame is an ACK frame and the second frame either is a data frame or management frame or a mmWaveCF-End frame.

20. The apparatus of claim 13, wherein the TA of the second frame is '0' and one of the TA and the RA of the first frame equals the RA of the second frame.

21. The apparatus of claim 20, wherein the second frame is an ACK frame and the first frame is either a data frame or management frame.

22. The apparatus of claim 13, wherein either the first or second frame is transmitted from a transmission opportunity holder/SP source.

* * * * *